(12) United States Patent
Menard

(10) Patent No.: US 11,159,104 B2
(45) Date of Patent: Oct. 26, 2021

(54) ENERGY HARVESTING SYSTEM

(71) Applicants: CARRIER CORPORATION, Jupiter, FL (US); Cyril Menard

(72) Inventor: Cyril Menard, Hauville (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 108 days.

(21) Appl. No.: 16/323,197

(22) PCT Filed: Aug. 11, 2016

(86) PCT No.: PCT/IB2016/001331
§ 371 (c)(1),
(2) Date: Feb. 4, 2019

(87) PCT Pub. No.: WO2018/029502
PCT Pub. Date: Feb. 15, 2018

(65) Prior Publication Data
US 2019/0165699 A1    May 30, 2019

(51) Int. Cl.
*H02N 2/18* (2006.01)
*B60H 1/00* (2006.01)
(Continued)

(52) U.S. Cl.
CPC ......... *H02N 2/188* (2013.01); *B60H 1/00357* (2013.01); *B60H 1/00428* (2013.01);
(Continued)

(58) Field of Classification Search
CPC .... H02N 2/188; H02N 2/181; B60H 1/00428; B60H 1/00357; B60H 1/00014;
(Continued)

(56) References Cited

U.S. PATENT DOCUMENTS 7,663,502 B2    2/2010    Breed
7,911,324 B2    3/2011    Breed et al.
(Continued)

FOREIGN PATENT DOCUMENTS

| WO | 2011008649 A2 | 1/2011 |
| WO | 2011050157 A2 | 4/2011 |
| WO | 2011060798 A1 | 5/2011 |

OTHER PUBLICATIONS

Tassou, S. A., De-Lille, G., & Lewis, J. (2012). Food transport refrigeration. Centre for Energy and Built Environment Research, Brunel University, UK. (Year: 2012).*

(Continued)

*Primary Examiner* — Daniel Cavallari
(74) *Attorney, Agent, or Firm* — Cantor Colburn LLP

(57) ABSTRACT

An energy harvesting system is provided. The energy harvesting system includes a transport refrigeration unit (TRU), a remote wireless element operably disposed to respond to a characteristic of the TRU and an energy harvesting circuit. The remote wireless element includes a battery and a response element powered by the battery. The energy harvesting circuit is coupled to the battery and configured to generate electricity from TRU movements. The electricity generated from the TRU movements is provided to at least one of the remote wireless element to power operations of the remote wireless element and the battery to charge the battery.

19 Claims, 4 Drawing Sheets

(51) Int. Cl.
*H02J 7/32* (2006.01)
*F25D 29/00* (2006.01)
*B60P 3/20* (2006.01)
*H01M 10/0525* (2010.01)
*H01M 10/46* (2006.01)
*H02J 7/02* (2016.01)

(52) U.S. Cl.
CPC .............. *B60P 3/20* (2013.01); *F25D 29/003* (2013.01); *H01M 10/0525* (2013.01); *H01M 10/46* (2013.01); *H02J 7/025* (2013.01); *H02J 7/32* (2013.01); *H02N 2/181* (2013.01); *B60H 1/00014* (2013.01); *H01M 2220/20* (2013.01); *Y02T 10/88* (2013.01)

(58) Field of Classification Search
CPC .. F25D 29/003; Y02T 10/88; H01M 2220/20; H01M 10/0525; H01M 10/46; Y02E 60/10; H02J 50/001; H02J 2310/40; H02J 7/32; H02J 7/025; B60P 3/20
See application file for complete search history.

(56) References Cited

U.S. PATENT DOCUMENTS

| | | | |
|---|---|---|---|
| 8,169,311 B1 | 5/2012 | Breed | |
| 8,266,917 B2* | 9/2012 | Waldschmidt | B60H 1/323 62/115 |
| 8,723,344 B1 | 5/2014 | Dierickx | |
| 9,106,160 B2 | 8/2015 | Loverich et al. | |
| 2004/0078662 A1 | 4/2004 | Hamel et al. | |
| 2005/0017602 A1* | 1/2005 | Arms | B60C 23/0413 310/339 |
| 2006/0176158 A1 | 8/2006 | Fleming | |
| 2008/0262646 A1* | 10/2008 | Breed | G07C 5/0808 700/226 |
| 2011/0105004 A1 | 5/2011 | Browne et al. | |
| 2012/0319472 A1 | 12/2012 | Arnold | |
| 2014/0191512 A1 | 7/2014 | Liao et al. | |
| 2014/0358343 A1 | 12/2014 | Chastang | |
| 2015/0076963 A1 | 3/2015 | Sipp | |
| 2015/0215684 A1* | 7/2015 | Kauffman | G06K 19/0723 340/870.16 |
| 2016/0079783 A1 | 3/2016 | Phan et al. | |
| 2016/0084550 A1 | 3/2016 | Fall et al. | |

OTHER PUBLICATIONS

ISR/WO, dated Nov. 23, 2016, PCT Application No. PCT/IB2016/001331, 23 pages.

O'Callaghan et al., "Harvesting Energy for the Cold: Battery-less Cold Chain Monitoring", May 30, 2014, URL:<http://www.supplychainbrain.com/content/latest-content/single-article/article/harvesting-energy-for-the-cold-battery-less-cold-chain-moni>, 2 pages.

Ottman, Adaptive Piezoelectric Energy Harvesting Circuit for Wireless Remote Power Supply', IEEE Transactions on Power Electronics, vol. 17, No. 5, Sep. 2002, pp. 669-676.

* cited by examiner

ENERGY HARVESTING SYSTEM

BACKGROUND OF THE DISCLOSURE

The subject matter disclosed herein relates to refrigeration units and associated components and, more particularly, to an energy harvesting system for refrigeration units and associated components.

Many goods need to be transported in a cargo space that is supplied with a stream of conditioned air. Typically, this conditioned air is refrigerated, but it may also or alternatively be heated. In order to achieve acceptable temperature uniformity within the cargo space, a jet of supply air is created that will ideally persist through the extent of the cargo space. This jet is often generated by a motorized fan that is fluidly receptive of cooled or heated air from a compressor of a transport refrigeration unit (TRU).

In order to insure that various TRU operations are conducted within acceptable parameters, it is often necessary to measure various characteristics of the TRU. Such measurements may take the form of, for example, temperature measurements to determine a degree of cooling that is currently being provided by a TRU and are executed by remote wireless temperature sensors. These remote wireless temperature sensors are typically battery powered and thus frequently low on power or running out of power.

BRIEF DESCRIPTION OF THE DISCLOSURE

According to one aspect of the disclosure, an energy harvesting system is provided. The energy harvesting system includes a transport refrigeration unit (TRU), a remote wireless element operably disposed to respond to a characteristic of the TRU and an energy harvesting circuit. The remote wireless element includes a battery and a response element powered by the battery. The energy harvesting circuit is coupled to the battery and configured to generate electricity from TRU movements. The electricity generated from the TRU movements is provided to at least one of the remote wireless element to power operations of the remote wireless element and the battery to charge the battery.

In accordance with additional or alternative embodiments, the remote wireless element comprises a remote wireless sensor.

In accordance with additional or alternative embodiments, the battery includes a rechargeable battery.

In accordance with additional or alternative embodiments, the battery includes a lithium-ion battery.

In accordance with additional or alternative embodiments, the TRU movements include vibrations and oscillations.

In accordance with additional or alternative embodiments, the energy harvesting circuit includes a piezoelectric material to convert the TRU movements into the electricity.

In accordance with additional or alternative embodiments, the energy harvesting circuit further includes a switching element to activate the piezoelectric material.

In accordance with additional or alternative embodiments, the energy harvesting circuit further includes a capacitor to store electrical charge generated by the piezoelectric material.

According to another aspect of the disclosure, a cargo transporter is provided and includes a power generation unit, a trailer, a transport refrigeration unit (TRU), which draws power from the power generation unit to condition an interior of the trailer, a remote wireless element operably disposed to respond to a characteristic of the TRU and an energy harvesting circuit. The remote wireless element includes a battery and a response element powered by the battery. The energy harvesting circuit is coupled to the battery and configured to generate electricity from TRU movements. The electricity generated from the TRU movements is provided to at least one of the remote wireless element to power operations of the remote wireless element and the battery to charge the battery.

In accordance with additional or alternative embodiments, the power generation unit includes a truck engine and the TRU includes a compressor that is driven by the truck engine.

In accordance with additional or alternative embodiments, the remote wireless element comprises a remote wireless sensor.

In accordance with additional or alternative embodiments, the battery includes a rechargeable battery.

In accordance with additional or alternative embodiments, the battery includes a lithium-ion battery.

In accordance with additional or alternative embodiments, the TRU movements include vibrations and oscillations.

In accordance with additional or alternative embodiments, the energy harvesting circuit includes a piezoelectric material to convert the TRU movements into the electricity.

In accordance with additional or alternative embodiments, the energy harvesting circuit further includes a switching element to activate the piezoelectric material.

In accordance with additional or alternative embodiments, the energy harvesting circuit further includes a capacitor to store electrical charge generated by the piezoelectric material.

In accordance with additional or alternative embodiments, the cargo transporter further includes a controller operably coupled to the energy harvesting circuit and configured to activate the energy harvesting circuit.

According to yet another aspect of the disclosure, a method of operating an energy harvesting system is provided. The method includes responding to a characteristic of a transport refrigeration unit (TRU) at a remote wireless element that includes a battery and a response element powered by the battery, determining a remaining charge of the battery and, in an event the remaining charge of the battery is less than a predefined level, activating an energy harvesting circuit coupled to the battery to generate electricity from TRU movements. The electricity generated from the TRU movements is provided to at least one of the remote wireless element to power operations of the remote wireless element and the battery to charge the battery.

In accordance with additional or alternative embodiments, the energy harvesting unit includes a piezoelectric material to convert the TRU movements into the electricity, a switching element to activate the piezoelectric material and a capacitor to store electrical charge generated by the piezoelectric material.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Concerns with energy consumption are issues of increasing importance in various technologies, such as cargo transportation. As such, efficiencies of transport refrigeration units (TRU) are being increased in order to consume less energy while maintaining or improving TRU performance capabilities. A result of such efforts, however, is that some associated components like wireless remote elements (e.g., wireless remote sensors and wireless remote accessories) are provided with their own energy sources. These energy sources are typically batteries that need to be replaced or recharged regularly.

Thus, as will be described below, a piezoelectric material is used to convert normally wasted movement (e.g., vibration or oscillation) energy in a localized environment around a TRU to usable electrical energy. This can be used to improve an efficiency of the TRU or to recharge a battery of a remote wireless element.

Figure 1:
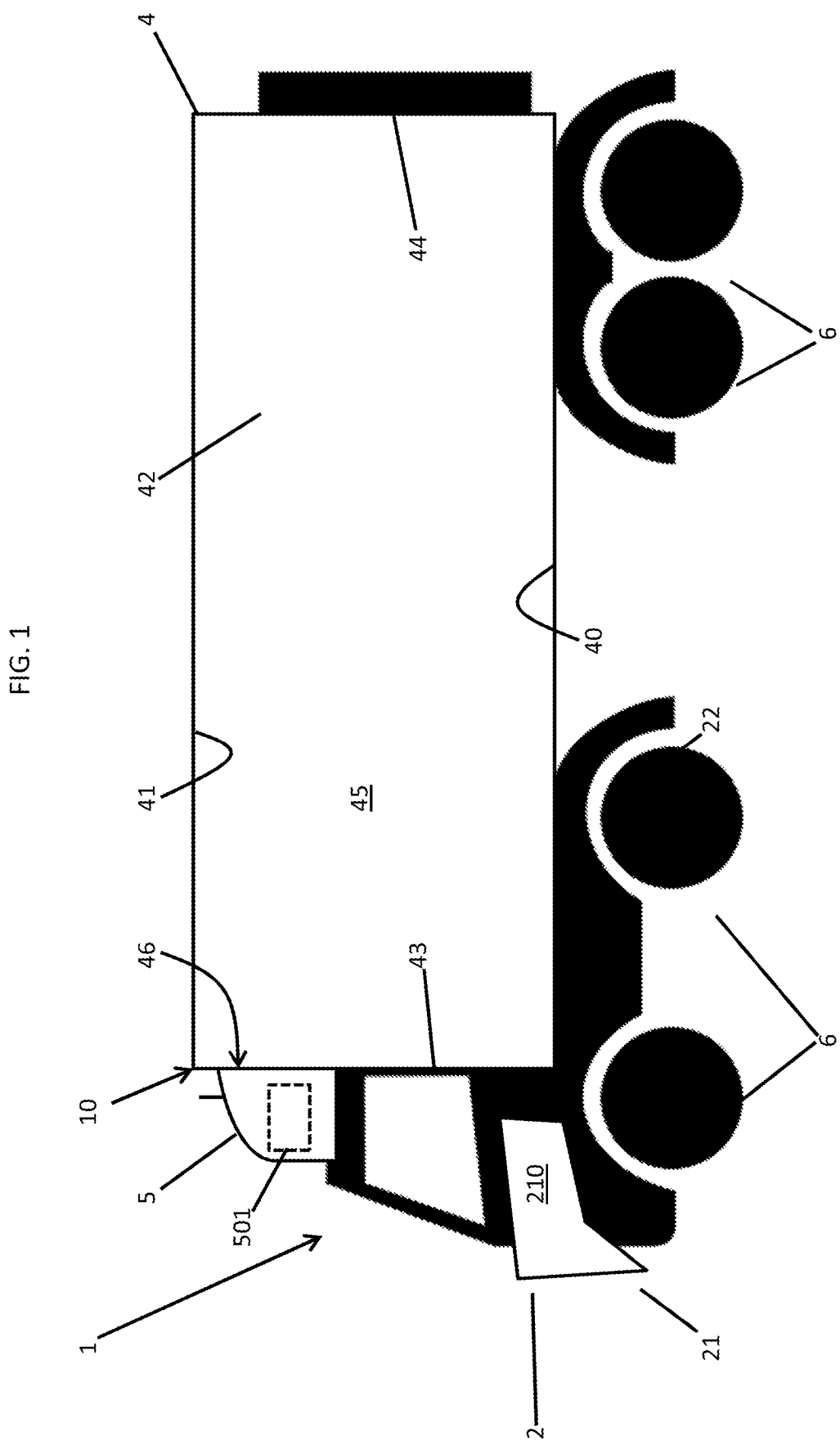
FIG. 1 is a side view of a truck in accordance with embodiments.

With reference to FIG. 1, an air supply system 10 is provided for use with a truck or a cargo transporter 1. As shown in FIG. 1, the cargo transporter 1 may include a rig 2 that is formed of a cab portion 21 having a power generation unit, such as an engine 210 and a cabin in which a driver and one or more passengers can sit and a flat-bed portion 22, a trailer 4, a TRU 5 and a plurality of axle and wheel assemblies 6 that are provided along a longitudinal axis of the rig 2 and the trailer 4. The flat-bed portion 22 extends in the aft direction from a rear of the cab portion 21 and has an upper surface on which a front end of the trailer 4 can securely sit. The plurality of axle and wheel assemblies 6 may be provided as components of the rig 2 and the trailer 4.

The trailer 4 is a generally elongate, rectangular body or enclosure and includes a bottom wall 40, a top wall 41 opposite the bottom wall 40, opposed sidewalls 42 that extend substantially vertically between the bottom and top walls 40 and 41, a front end wall 43 and a rear end wall 44. The front and rear end walls 43 and 44 oppose one another and extend substantially vertically between the bottom and top walls 40 and 41 and substantially horizontally between the sidewalls 42. The trailer 4 may be substantially hollow and thus capable of storage of any type of cargo with the bottom wall 40, the top wall 41, the sidewalls 42 and the front and rear end walls 43 and 44 defining an interior 45. The rear end wall 44, for example, may include a hatch by which the interior 45 is accessible.

Figure 2:
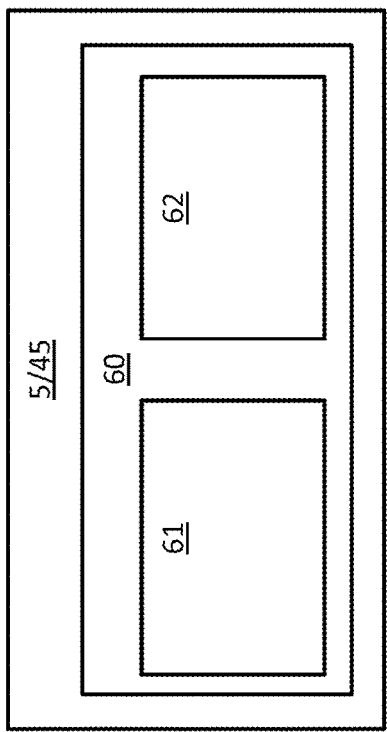
FIG. 2 is a schematic diagram of a remote wireless element in accordance with embodiments.
Figure 3:
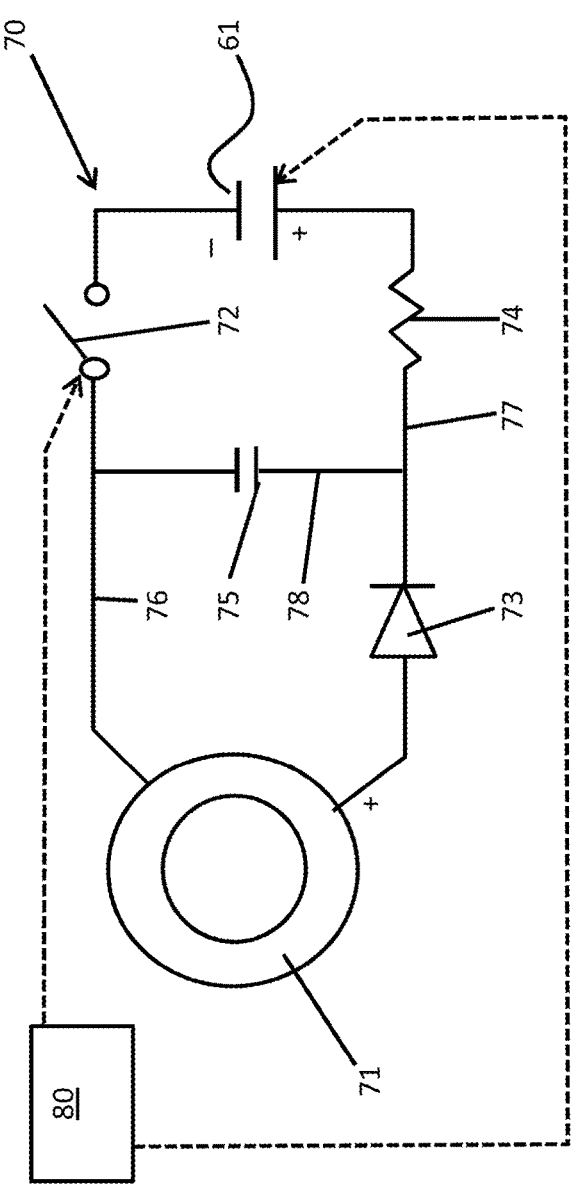
FIG. 3 is a circuit diagram of an energy harvesting circuit in accordance with embodiments.

With continued reference to FIG. 1 and with additional reference to FIGS. 2 and 3, the TRU 5 is generally configured to generate a jet of fluid flow to either cool or heat the interior 45 of the trailer 4 and may be provided at various positions relative to the interior 45. For purposes of clarity and brevity, however, the following description will relate only to the case of the TRU 5 being provided at the front end wall 43 of the trailer 4 with access to the interior 45 by way of an opening 46 defined in the front end wall 4. In any case, the TRU 5 may include a compressor 501 and may be configured to draw power from the engine 210 of the power generation unit to condition the interior 45.

While the TRU 5 is described herein as being powered by the engine 210 and the power generation unit as a whole, it is to be understood that this is not required. Indeed, in accordance with alternative embodiments, the TRU 5 may be autonomous at least with respect to the engine 210 or the power generation unit as a whole. In such cases, the TRU 5 may include a TRU 5 engine or some other motive power device.

As shown in FIGS. 1-3, the cargo transporter 1 may further include a remote wireless element 60 and an energy harvesting circuit 70 as part of an energy harvesting system of which the TRU 5, the remote wireless element 60 and the energy harvesting circuit 70 are components.

The remote wireless element 60 is operably disposed to respond to a characteristic of the TRU 5 and includes a battery 61 and a response element 62 that is generally powered by the battery 61. The battery 61 can be any type of rechargeable battery and, in some cases, may be provided as a lithium-ion battery for example (though it is to be understood that other types of batteries are possible). The response element 62 may be provided as a sensor in a case in which the remote wireless element 60 is a remote wireless sensor or as an accessory unit in a case in which the remote wireless element 60 is a remote wireless accessory. The energy harvesting circuit 70 is coupled to the battery 61 and configured to generate electricity from movements of the TRU 5. The movements of the TRU 5 may include vibratory movements and/or oscillatory movements associated with various operations of the TRU 5 in particular and the cargo transporter 1 as a whole as the cargo transporter 1 moves along road surfaces and vibrates as a result (i.e., road vibrations). The generated electricity can then be provided to at least one of the remote wireless element 60 and the battery 61. Such provision of the electricity generated from the movements of the TRU 5 can be used to power operations of the remote wireless element 60. Similarly, such provision of the electricity generated from the movements of the TRU 5 can be used to charge the battery 61.

As shown in FIG. 3, the energy harvesting circuit 70 may include a piezoelectric material 71 to convert the movements of the TRU 5 and the road vibrations into the electricity, a switching element 72, a diode 73, a resistive element 74 and a capacitor 75. In greater detail, the energy harvesting circuit 70 includes a first circuit trace 76 extending from the piezoelectric material 71 to the negative lead of the battery 61, a second circuit trace 77 that extends from the positive lead of the battery 61 to the piezoelectric material 71 and a third circuit trace 78 connecting the first and second circuit traces 76 and 77 together.

The switching element 72 is operably disposed along the first circuit trace 76 between a connection between the first and third circuit traces 76 and 78 and the battery 61. The resistive element 74 and the diode 73 are arranged in series along the second circuit trace 77 between the positive lead of the battery 61 and the piezoelectric material 71. The third circuit trace 78 is connected to the second circuit trace 76 between the diode 73 and the resistive element 74. The capacitor 75 is operably disposed along a central portion of the third circuit trace 78.

With the arrangement described above, the switching element 72 is disposed and configured to activate the piezoelectric material 71 to operate the remote wireless element 60 or to charge the battery 61 while the capacitor 75 is disposed and configured to store electrical charge generated by the piezoelectric material 71.

The energy harvesting circuit 70 may further include a controller 80, which is coupled to the battery 61 and the switching element 72 and thus is disposed and configured to activate the energy harvesting circuit 70. In particular, the controller 80 is configured to determine at least one of a load applied to the battery 61 and a remaining charge of the battery 61 and to activate the energy harvesting circuit 70 by closing the switching element 72 based on results of the determinations. That is, the controller 80 closes the switching element 72 when the load applied to the battery 61 is greater than a capacity of the battery 61 or when the load would be expected to drain the battery 61 in a given period of time. Alternatively, the controller 80 may close the switching element 72 when a remaining charge of the battery 61 is below a predefined level. In the former case, the electricity generated by the piezoelectric material 71 can be used to supplement the electricity provided to the load by the battery 61. In the latter case the electricity generated by the piezoelectric material 71 can be used to recharge the battery 61.

Figure 4:
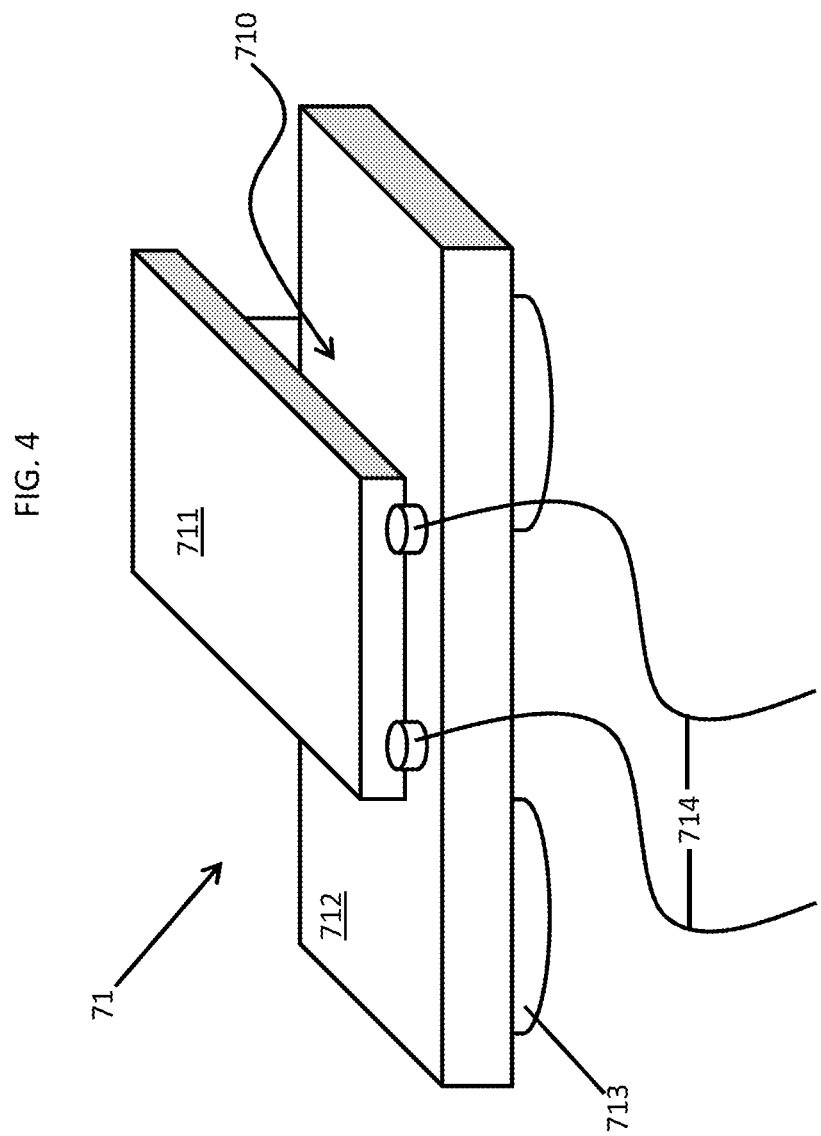
FIG. 4 is a perspective view of a piezoelectric material of the energy harvesting circuit of FIG. 3.

With reference to FIG. 4, the piezoelectric material 71 may be provided as part of a piezoelectric material assembly 710. As shown in FIG. 4, the piezoelectric material assembly 710 may include a piezoelectric material part 711, a piezoelectric material clamp 712 with mountings 713 and leads 714. The piezoelectric material part 711 may be a dual layer piezoelectric material product that is recommended for energy harvesting and sensing applications. The piezoelectric material part 711 exhibits good performance as a resonant actuator and has multiple piezo layers along with mounting and alignment holes. The piezoelectric material clamp 712 and mountings 713 serve to secure the piezoelectric material part 711 to the TRU 5, for example, such that the movements of the TRU 5 (e.g., the vibrations and oscillations thereof) are transmitted to the piezoelectric material part 711. The leads 714 electrically connect the piezoelectric material part 711 to the first and second circuit traces 76 and 77.

Figure 5:
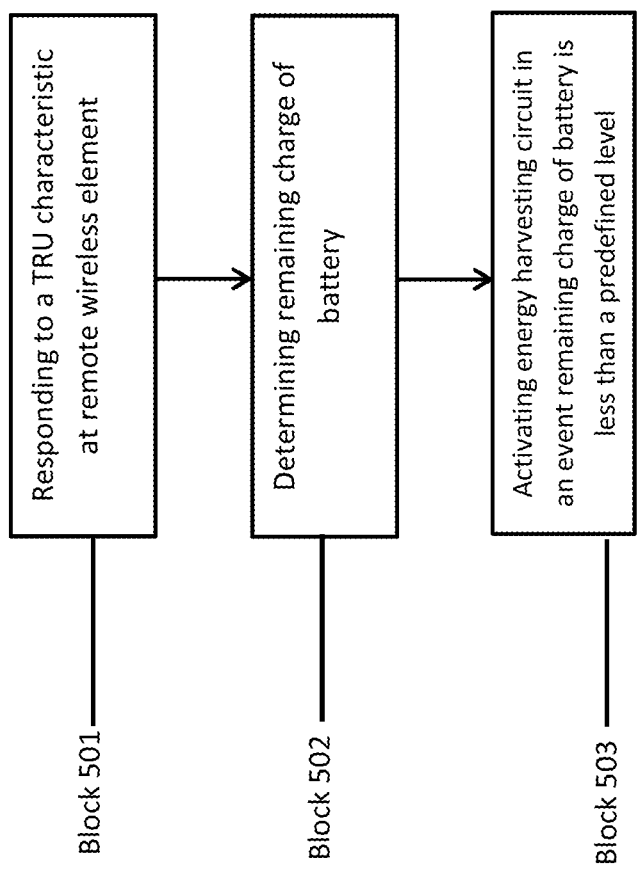
FIG. 5 is a flow diagram illustrating a method of operating an energy harvesting circuit.

With reference to FIG. 5, a method of operating the energy harvesting system described above is provided. As shown in FIG. 5, the method includes responding to a characteristic of the TRU at the remote wireless element 60 (block 501), determining a remaining charge of the battery 61 (block 502) and, in an event the remaining charge of the battery 61 is less than a predefined level, activating the energy harvesting circuit 70 (block 503). As explained above, such activation of the energy harvesting circuit 70 will allow the piezoelectric material 71 to generate electricity from movements of the TRU 5. The electricity generated from the movements of the TRU is provided to at least one of the remote wireless element 60 to power operations of the remote wireless element 60 and the battery 61 to charge the battery 61. Such provision of the electricity generated from the movements of the TRU can be done without the need to draw power from the engine 210 in particular or from the power generation unit as a whole.

Use of the energy harvesting system described herein allows for free energy to be used to improve efficiencies of the TRU 5 and/or to bring some associated sensors, accessories or components of the TRU 5 into a partially or fully autonomous condition.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An energy harvesting system, comprising:
   a transport refrigeration unit (TRU);
   a remote wireless element operably disposed to respond to a characteristic of the TRU, the remote wireless element comprising a battery and a response element powered by the battery;
   an energy harvesting circuit coupled to the battery and configured to generate electricity from TRU movements, the electricity generated from the TRU movements being provided to at least one of the remote wireless element to power operations of the remote wireless element and the battery to charge the battery; and
   a controller operably coupled to the energy harvesting circuit and configured to determine at least one of a load applied to the battery and a remaining charge of the battery, and to activate the energy harvesting circuit in accordance with at least one of the load applied to the battery being greater than a capacity of the battery, the load being expected to drain the battery in a given period of time and a remaining charge of the battery being below a predefined level.

2. The energy harvesting system according to claim 1, wherein the remote wireless element comprises a remote wireless sensor.

3. The energy harvesting system according to claim 1, wherein the battery comprises a rechargeable battery.

4. The energy harvesting system according to claim 1, wherein the battery comprises a lithium-ion battery.

5. The energy harvesting system according to claim 1, wherein the TRU movements from which electricity is generated by a piezoelectric material of the energy harvesting circuit comprise vibrational movements of the TRU, which are transmitted to the piezoelectric material, and oscillatory movements of the TRU, which are transmitted to the piezoelectric material.

6. The energy harvesting system according to claim 1, wherein the energy harvesting circuit comprises a piezoelectric material to convert the TRU movements into the electricity.

7. The energy harvesting system according to claim 6, wherein the energy harvesting circuit further comprises a switching element to activate the piezoelectric material.

8. The energy harvesting system according to claim 6, wherein the energy harvesting circuit further comprises a capacitor to store electrical charge generated by the piezoelectric material.

9. A cargo transporter, comprising:
   a power generation unit;
   a trailer;
   a transport refrigeration unit (TRU), which draws power from the power generation unit to condition an interior of the trailer;

a remote wireless element operably disposed to respond to a characteristic of the TRU, the remote wireless element comprising a battery and a response element powered by the battery;

an energy harvesting circuit coupled to the battery and configured to generate electricity from TRU movements, the electricity generated from the TRU movements being provided to at least one of the remote wireless element to power operations of the remote wireless element the battery to charge the battery; and a controller operably coupled to the energy harvesting circuit and configured to determine at least one of a load applied to the battery and a remaining charge of the battery, and to activate the energy harvesting circuit in accordance with at least one of the load applied to the battery being greater than a capacity of the battery, the load being expected to drain the battery in a given period of time and a remaining charge of the battery being below a predefined level.

10. The cargo transporter according to claim 9, wherein the power generation unit comprises a truck engine and the TRU comprises a compressor that is driven by the truck engine.

11. The cargo transporter according to claim 9, wherein the remote wireless element comprises a remote wireless sensor.

12. The cargo transporter according to claim 9, wherein the battery comprises a rechargeable battery.

13. The cargo transporter according to claim 9, wherein the battery comprises a lithium-ion battery.

14. The cargo transporter according to claim 9, wherein the TRU movements from which electricity is generated by a piezoelectric material of the energy harvesting circuit comprise vibrational movements of the TRU, which are transmitted to the piezoelectric material, and oscillatory movements of the TRU, which are transmitted to the piezoelectric material.

15. The cargo transporter according to claim 9, wherein the energy harvesting circuit comprises a piezoelectric material to convert the TRU movements into the electricity.

16. The cargo transporter according to claim 15, wherein the energy harvesting circuit further comprises a switching element to activate the piezoelectric material.

17. The cargo transporter according to claim 15, wherein the energy harvesting circuit further comprises a capacitor to store electrical charge generated by the piezoelectric material.

18. The cargo transporter according to claim 9, further comprising a controller operably coupled to the energy harvesting circuit and configured to activate the energy harvesting circuit.

19. The energy harvesting system according to claim 1, wherein the energy harvesting circuit comprises:

a piezoelectric material to convert the movements of the TRU into the electricity;

first, second and third circuit traces extending from the piezoelectric material to a negative lead of the battery, extending from a positive lead of the battery to the piezoelectric material and connecting the first and second circuit traces together, respectively;

a switching element disposed along the first circuit trace between a connection between the first and third circuit traces and the negative lead of the battery;

a diode and a resistive element arranged in series along the second circuit trace between the positive lead of the battery and the piezoelectric material with the third circuit trace being connected to the second circuit trace between the diode and the resistive element; and a capacitor operably disposed along a central portion of the third circuit trace.

* * * * *